March 28, 1933. A. REAM 1,903,134
AUTOMOBILE HEATING SYSTEM
Filed March 21, 1930
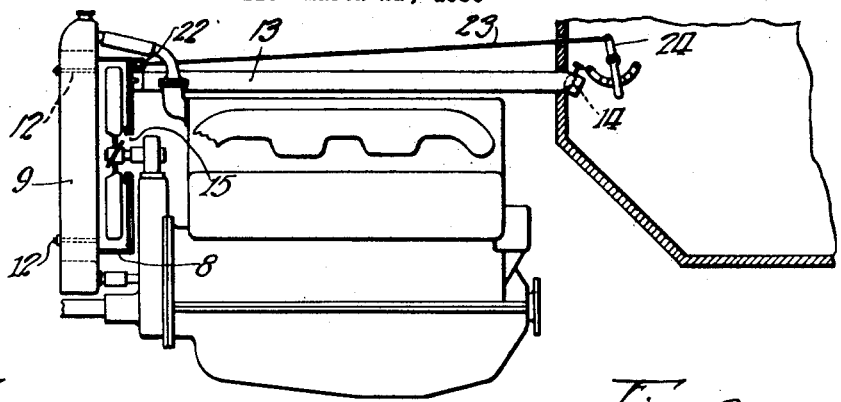
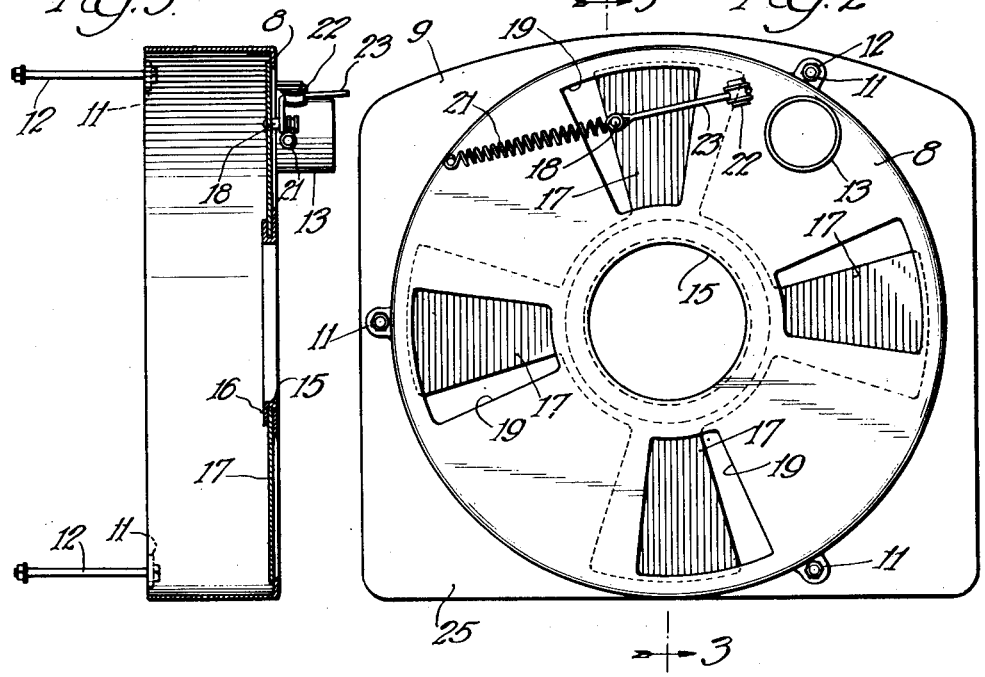
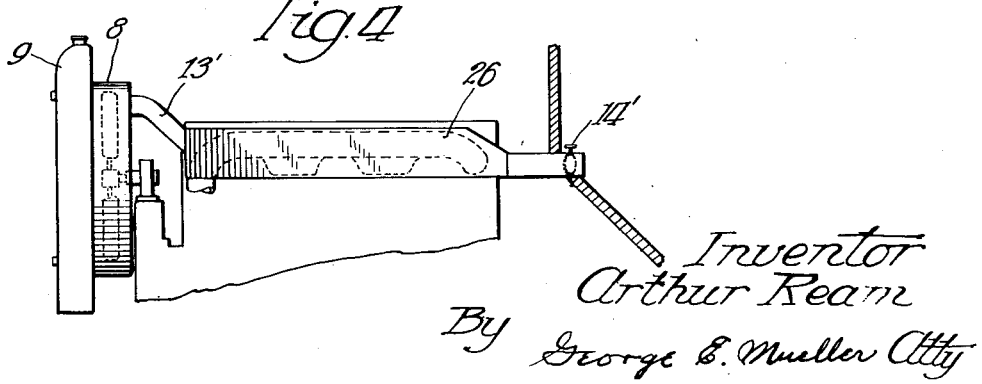
Inventor
Arthur Ream
By George E. Mueller Atty Patented Mar. 28, 1933

1,903,134

UNITED STATES PATENT OFFICE

ARTHUR REAM, OF CHICAGO, ILLINOIS

AUTOMOBILE HEATING SYSTEM

Application filed March 21, 1930. Serial No. 437,654.

My invention relates to an automobile heating system, and more particularly to a combined heater for the automobile and winter front for the radiator.

There are several types of automobile heaters now on the market with which I am familiar. One type utilizes the heat from the exhaust gases which are inducted into the automobile by convection. Another type of automobile heater employs a radiator in the automobile through which the heated water from the engine circulates to heat the car. A disadvantage of the first type is that while there is sufficient heat obtainable from the exhaust, the means for conveying the heat to the automobile are lacking in positiveness of operation. The second type of heater referred to requires elaborate and expensive equipment and requires a large amount of space in the automobile.

In accordance with the general features of my invention I provide a heating system which derives a portion of all of its heat from the automobile radiator and at the same time controls the amount of air passing through the apertures of the radiator to regulate the temperature of the water in the engine cooling system.

An object of my invention is to provide a new and improved automobile heating system.

A further object is to provide a combined heater and winter front for an automobile.

A further object is to provide a heater or winter front which acts as a guard for the radiator fan.

A further object is to provide a heater which derives a portion or all of its heat from the automobile radiator.

A further object is to provide a heating system which utilizes the automobile fan for inducing a positive stream of heated air into the automobile.

Other objects and advantages will appear as the description proceeds.

Referring to the drawing:

Fig. 1 is a side elevation partly in section showing the device of my invention attached to an automobile, Fig. 2 is a rear elevation of the fan casing, Fig. 3 is a sectional view taken on line 3—3 of Fig. 2, and, Fig. 4 is a side elevation of a modified form of the invention.

The apparatus comprises a casing 8, which is adapted to be mounted against the rear side of a radiator 9. The casing is preferably made circular in outline and is provided with a plurality of tongues 11 which cooperate with bolts 12 to secure the casing to the radiator. I have found that the casing may be made rectangular if desired; however, with that construction it is advisable to cover the apertures through the radiator in the corners of the casing to prevent the air from being drawn through the circular area covered by the fan and exhausted forwardly from the casing through the corners of the casing. By making the casing circular in outline there is sufficient area of the back of the radiator covered to cause the casing to act as a shutter or winter front such as is often attached to the front side of the radiator in cold weather to prevent excessive cooling of the liquid in the radiator. Connected to the casing 8, is a conduit 13 which leads into the interior of the automobile to convey the air which has been heated by passing through the radiator into the car. Since the liquid in the upper part of the radiator is at a higher temperature than that in the lower part, the conduit 13 is preferably connected to the casing near the top thereof. In order to regulate the amount of air entering the automobile, a butterfly valve 14, is provided in the conduit in convenient reach of the driver. The casing substantially encloses the fan of the automobile except for a central aperture 15 through which the shaft of the fan extends. Aperture 15 may be made just large enough to allow the shaft of the fan to pass therethrough, or it may be made considerably larger to permit a limited amount of air to pass through the radiator and from the casing. The edge of aperture 15 is turned inwardly and formed into a U-shape to provide a groove 16 in which a shutter 17 is adapted to rotate. One of the vanes of the shutter is provided with a stud 18, by means of which apertures 19 in the casing may be opened and closed by movement of the shutters. It will be understood that the number and shape of apertures 19, and of the shutter may be varied to meet the requirements of any particular make of automobile. A spring 21 is secured to stud 18 and serves to move the shutter in such a direction as to close the venting apertures 19 of the casing. A pulley 22 is also connected to the casing, and a cord 23 passes around the pulley and is also secured to stud 18. The opposite end of this cord is secured to a lever 24 on the inside of the automobile by means of which the venting of the casing may be controlled. When the venting apertures are closed the pressure, due to the fan in casing 8, causes the air which has been heated by passing through the radiator, to pass through conduit 13 into the car. After the car has become warmed up and the temperature of the engine cooling system has attained the proper operating temperature, lever 24 may be shifted to a position to slightly vent the casing, which at the same time reduces the amount of heated air delivered into the automobile. When the outdoor temperature is quite mild, the shutter may be moved to such a position as to completely open apertures 19 and at the same time shut off the entrance to conduit 13. In some climates the weather may be so cold that that area of the radiator which is not covered by the casing should also be protected by preventing the passing of air therethrough. This may be done by providing a plane shield 25 which covers that area of the back of the radiator not covered by the casing. However, in most localities, the casing alone will be sufficient, since there is no forced draft owing to the fan in those areas of the radiator not covered by the casing.

Fig. 4 shows a modified form of the invention which is similar in most respects to the embodiment shown in Figs. 1 to 3, except that a housing 26 is provided over the manifold and conduit 13' leads from the casing through the manifold housing and then into the interior of the automobile. This embodiment provides considerably more heat for the automobile and has the advantage that the air is positively forced through the manifold heater and into the automobile. A butterfly valve 14 is also provided to prevent too great a quantity of heat being delivered into the car. It is evident that an automatic control such as a thermostatic control may be used in order to operate the shutter in accordance with the temperature of the liquid in the engine cooling system.

It will be understood that the embodiments of the invention herein described and disclosed are merely illustrative and that many other modifications may be made therein without departing from the spirit and scope of the invention.

What I claim as new and desire to protect by Letters Patent of the United States is:—

1. A device for use with an automobile having a radiator and a fan therefor, comprising an open faced drum-like casing for closely enclosing the back and sides of the fan and adapted to be mounted against the inside face of radiator whereby the fan may create a pressure in the casing by air drawn through the radiator, a manually rotatable multiple opening shutter mounted upon the rear wall of the casing to control the amount of air admitted through the radiator to control the temperature thereof, and a conduit connected to the casing and adapted to lead into the automobile body to heat the interior thereof.

2. A device for use with an automobile having a radiator and fan therefor, comprising an open faced drum-like circular casing for closely enclosing the back and sides of the fan and adapted to be mounted against the inside face of the radiator, means whereby said casing may be readily applied to and removed from the radiator, a central opening in the face of the drum through which the shaft of the fan may extend, a shutter rotatably mounted against the inner face of the rear wall of the casing, said shutter being rotatably mounted around the central opening of the rear wall and having a plurality of radially disposed blades cooperating with corresponding openings in the rear wall of the casing, and means for rotatably adjusting the shutter so as to open and close the same.

In witness whereof, I hereunto subscribe my name this 10th day of March, 1930.

ARTHUR REAM.